United States Patent
Hsu et al.

(10) Patent No.: US 11,321,636 B2
(45) Date of Patent: May 3, 2022

(54) SYSTEMS AND METHODS FOR A DATA STORAGE SYSTEM

(71) Applicant: Innogrit Technologies Co., Ltd., Shanghai (CN)

(72) Inventors: Yan-Ruey Hsu, Zhubei (TW); Yuan-Mao Chang, Hsinchu (TW); Fang-Ju Ku, Zhubei (TW)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 382 days.

(21) Appl. No.: 16/515,160

(22) Filed: Jul. 18, 2019

(65) Prior Publication Data

US 2021/0019650 A1    Jan. 21, 2021

(51) Int. Cl.
*G06N 20/00* (2019.01)
*G06F 3/06* (2006.01)
*G06N 3/08* (2006.01)

(52) U.S. Cl.
CPC .......... *G06N 20/00* (2019.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,747,202 B1 | 8/2017 | Shaharabany et al. | |
| 2012/0317337 A1 | 12/2012 | Johar et al. | |
| 2015/0186260 A1* | 7/2015 | Camp ................. | G06F 11/1012 711/103 |
| 2016/0267396 A1* | 9/2016 | Gray ..................... | G06N 20/00 |
| 2020/0019506 A1* | 1/2020 | Ray ..................... | G06F 12/0871 |
| 2020/0184370 A1* | 6/2020 | Ben-Arie ............. | G06K 9/6218 |

FOREIGN PATENT DOCUMENTS

| | | |
|---|---|---|
| CN | 106874213 A | 6/2017 |
| CN | 109189693 A | 1/2019 |

* cited by examiner

*Primary Examiner* — Idriss N Alrobaye
*Assistant Examiner* — Dayton Lewis-Taylor
(74) *Attorney, Agent, or Firm* — IPro, PLLC; Xiaomin Huang

(57) ABSTRACT

Systems, apparatus and methods are provided for determining whether data associated with a command in a storage system is hot or cold. An apparatus may comprise a first interface to be coupled to a host and circuitry configured to receive a command via the first interface from the host. The command may contain an address for data storage in a data storage system and a length for a size of data associated with the command. The circuitry may be further configured to classify the command into a cluster of a plurality of clusters, obtain a plurality of historical commands in the cluster and determine whether the data associated with the command is hot or cold using a machine learning model. The address and the length of the command and addresses and lengths of the plurality of historical commands may be used as input features to the machine learning model.

20 Claims, 4 Drawing Sheets

SYSTEMS AND METHODS FOR A DATA STORAGE SYSTEM

TECHNICAL FIELD

The disclosure herein relates to data storage, particularly relates to data storage systems containing flash memories.

BACKGROUND

Most computing systems have a storage for storing data. With the development in the storage technology, a lot of modern data storage devices use memory devices such as flash memories instead of more conventional magnetic storage. Memory devices have no moving parts and thus provide excellent stability, durability, high information access speed, and low power consumption. Examples of data storage devices having such advantages include universal serial bus (USB) drives, memory cards having various interfaces, and solid state drives (SSDs). To improve effectiveness and lifespan of flash memory products, improved methods and storage systems are needed.

SUMMARY

The disclosed subject matter relates to systems, methods, and devices that may determine whether data associated with a command received in a storage system is hot or cold. In an exemplary embodiment, there is provided an apparatus that may comprise a first interface to be coupled to a host and circuitry configured to: receive a command via the first interface from the host, the command containing an address for data storage in a data storage system and a length for a size of data associated with the command; classify the command into a cluster of a plurality of clusters; obtain a plurality of historical commands in the cluster; and determine whether the data associated with the command is hot or cold using a machine learning model with the address and the length of the command and addresses and lengths of the plurality of historical commands as input features to the machine learning model.

In another exemplary embodiment, there is provided a method comprising: receiving a command in a data storage system, the command containing an address for data storage in the data storage system and a length for a size of data associated with the command; classifying the command into a cluster of a plurality of clusters; obtaining a plurality of historical commands in the cluster; and determining whether the data associated with the command is hot or cold using a machine learning model with the address and the length of the command and addresses and lengths of the plurality of historical commands as input features to the machine learning model.

In yet another embodiment, there may be provided one or more non-transitory computer-readable media encoded with computer executable instructions that, when executed, cause at least one processor to perform actions comprising: receiving a command in a data storage system, the command containing an address for data storage in the data storage system and a length for a size of data associated with the command; classifying the command into a cluster of a plurality of clusters; obtaining a plurality of historical commands in the cluster; and determining whether the data associated with the command is hot or cold using a machine learning model with the address and the length of the command and addresses and lengths of the plurality of historical commands as input features to the machine learning model.

DETAILED DESCRIPTION

Figure 1:
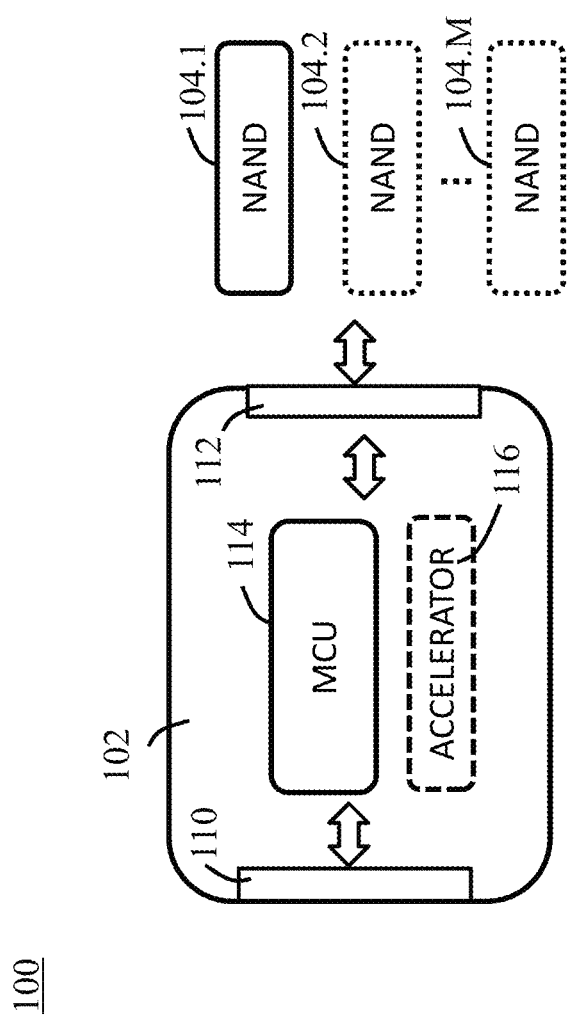
FIG. 1 schematically shows a storage system in accordance with an embodiment of the present disclosure.

Specific embodiments according to the present disclosure will now be described in detail with reference to the accompanying figures. Like elements in the various figures are denoted by like reference numerals for consistency.

FIG. 1 schematically shows an exemplary storage system 100 according to an embodiment. The storage system 100 may comprise a storage controller 102 and one or more non-volatile storage devices 104.1 to 104.M. The storage controller 102 may comprise a first interface 110, a second interface 112, a microcontroller unit (MCU) 114 and an optional accelerator 116. The first interface 110 may be any existing or yet to be developed interface that is configured to couple the storage system 100 to a host (e.g., a computing system) and receive data from and transmit data to the host. In one embodiment, for example, the first interface 110 may be an Advanced eXtensible Interface (AXI). In another embodiment, the first interface 110 may be another suitable interface for a host to access the storage system. The second interface 112 may be any existing or yet to be developed interface that is configured to couple a storage controller to one or more storage devices. In one embodiment, the second interface 112 may be a multi-channel interface that may be configured to transfer encoded data (e.g., Error Correction Coding (ECC) codewords) over multiple channels in parallel. For example, the second interface 112 may be an Open NAND Flash Interface (ON FI) that may support different protocols (e.g., Non-volatile Double Data Rate (NVDDR), NVDDR Type 2 (NVDDR2), NVDDR Type Three (NVDDR3), and Toggle protocols) and run at different transfer speeds.

The non-volatile storage devices 104.1 through 104.M may be non-volatile memory devices (NVMs). In one embodiment, there may be only one non-volatile storage device 104.1. In another embodiment, there may be more than one non-volatile storage device with the non-volatile storage devices 104.2 through 104.M (shown in phantom). When there are a plurality of non-volatile storage devices, M may be a positive integer larger than one, for example, 2, 3, 4 or a larger number. In various embodiments, the storage system 100 may be a USB, a SSD or any other suitable storage system comprising NVMs.

The host may perform a variety of data processing tasks and operations using the data storage system 100 via the first interface 110. In an embodiment, the host may use a logical block address (LBA) for specifying the location of blocks of data stored on the data storage devices. LBA may be a linear addressing scheme in which blocks may be located by an integer index, for example, the first block being LBA 0, the second LBA 1, and so on. When the host wants to read or write data to the storage system, the host may issue a read or write command with an LBA and a length to the storage system.

In some embodiments, mapping from LBA to physical address may be performed by the MCU 114. The MCU 114 may be a computer processor configured to execute executable instructions (e.g., software or firmware). In various embodiments, the MCU 114 may be a microprocessor, a microcontroller, a field-programmable gate array (FPGA), or an application-specific IC (ASIC) or a Graphic Processing Unit (GPU). Not all embodiments may have the optional accelerator 116. In an embodiment that the accelerator 116 is provided, some computation tasks may be carried out by the accelerator 116. The accelerator 116 may be implemented by a microprocessor, a microcontroller, a FPGA, an ASIC or a GPU.

Data may be stored in the non-volatile storage devices 104.1 through 104.M on physical pages of physical blocks. The logical blocks used by the host are mapped or translated to physical address by the storage controller 102. It should be noted that the data sent by the host may be encoded (e.g., ECC encoded) into codewords at the storage controller 102 and the codewords are saved to the non-volatile storage devices. Therefore, in some embodiments, the storage controller 102 may comprise one or more ECC encoders and one or more ECC decoders.

Non-volatile storage devices such as flash memory devices, however, have some unique characteristics. For example, a flash memory must be erased before written. In an embodiment, the erasure size may be a block, which is larger than a page that is the unit size of a write operation. A garbage collection process may be performed before a rewrite takes place. During garbage collection, pages with valid data in a block to be erased are read and rewritten in another previously erased block, then the whole block is erased and ready for new data.

Data stored on the non-volatile storage devices 104.1 through 104.M may be categorized as hot or cold according to access characteristics. For example, data stored at a certain LBA may be hot data when the host (e.g., the operating system (OS) of the host computing system) frequently access that data; and data stored at a certain LBA may be cold data when the host (e.g., the operating system (OS) of the host computing system) seldomly access that data. There may be four categories of hot/cold data: hot write, hot read, cold write and cold read. Hot write may refer to data frequently write to a certain LBA. Hot read may refer to data frequently read from a certain LBA. Cold write may refer to data seldomly write to a certain LBA. Cold read may refer to data seldomly read from a certain LBA.

The storage system 100 may be configured to perform hot/cold data determination to have improved efficiency. For example, the storage system 100 may perform garbage collection, during which certain blocks may be picked for erasure. If a block picked for erasure has valid data, that valid data need to be saved to a different block. In an embodiment, the storage controller 102 may be configured to determine whether data in a storage block is hot or cold, and whether to choose that block for garbage collection. For example, if a block contains one or more pages of hot write data, that data may be modified in near future and the one or more pages containing that data will be marked as invalid soon. Therefore, the storage controller 102 may determine that the block is not a good candidate for garbage collection and the block may be directly erased when all pages in the block become invalid.

Moreover, the storage system 100 may provide wear leveling. Flash memory may be programmed (e.g., written to) and erased only a limited number of times, which may be referred to a maximum Program/Erase (P/E) cycles. If a storage block is programmed and erased repeatedly, the block may wear out soon. Wear leveling may distributes writes as evenly as possible across all blocks in a non-volatile storage device. In one embodiment, cold write data may be moved from blocks so that these blocks may be used for hot write data, thus more evenly increasing P/E cycles for all block and obtaining an improved wear leveling for the storage device.

Furthermore, the storage system 100 may provide overprovisioning for storage such that provided storage size may be larger than a nominal value. For example, a storage system may nominally provide 4 GB storage space (e.g., user capacity) but may provide 5 GB storage space (e.g., physical capacity). In this example, the storage system provides 20% overprovisioning (e.g., (physical capacity—user capacity)/user capacity). Overprovisioning may allow a storage system reserve some blocks for garbage collection and wear leveling. Embodiments implementing hot/cold determination may reduce the chance for garbage collection and more evenly place frequently write data, and thus may reduce the overprovisioning ratio.

In yet another example, the plurality of non-volatile storage devices 104.1 through 104.M may comprise different types of NAND such as fast NAND (e.g., Single-Level Cell (SLC)) and slow NAND (e.g., Quad-Level Cell (QLC)). Fast NAND may have a faster read/program time and more PE cycles but is expensive and has a smaller capacity. Slow NAND may have a larger capacity but less PE cycles and longer read/program time. The storage controller 102 may be configured to store hot data to fast NAND and cold data to slow NAND to improve the overall performance.

It should be noted that embodiments according to present disclosure may include many applications that improves efficiency and lifetime of the storage system 100. Garbage collection, overprovisioning, wear leveling, storing hot or cold data to different types of NVMs are non-limiting examples.

When the host send data to the storage system 102 or read data from the storage system 102, the host may issue a write or read command with an LBA specifying the location of data storage, a length specify the size of data storage. For example, the host may issue a write command with address being LBA 100 and length being 5 for writing data to 5 logical blocks (e.g., writing to LBA 100 through LBA 104), or the host may issue a read command with address being LBA 002 and length being 2 for reading from 2 logical blocks (e.g., reading from LBA 2 and LBA 003). Embodiments according to the present disclosure may determine whether data associated with the command may be hot or cold.

Figure 2:
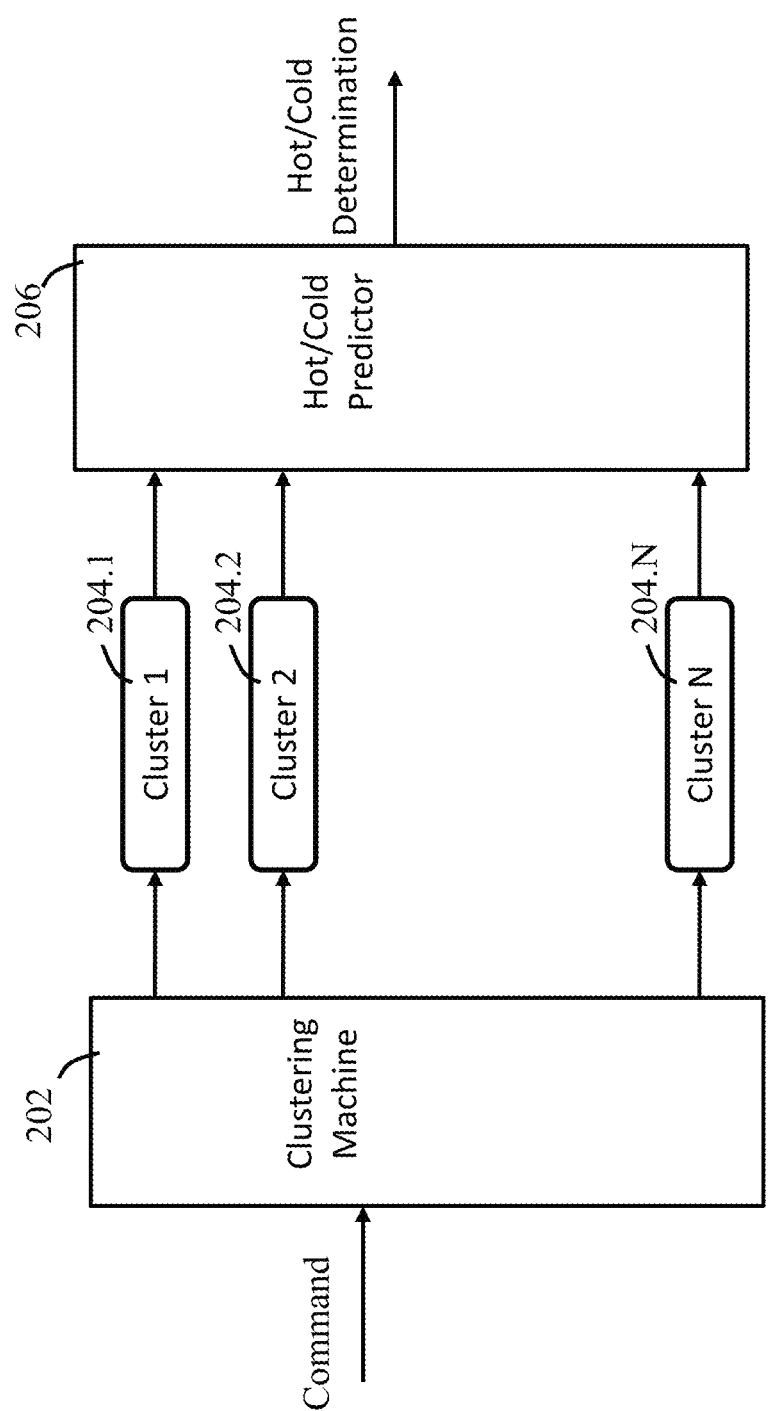
FIG. 2 schematically shows hot/cold data determination in accordance with an embodiment of the present disclosure.

FIG. 2 schematically shows hot/cold data determination implemented in a storage controller 102 in accordance with an embodiment of the present disclosure. The storage controller 102 may receive a command for accessing a data storage (e.g., via the first interface 110). The command may comprise an address (e.g., an LBA) and a length (e.g., a size of data associated with the command), and may have a timing (e.g., when the command is issued based on CPU clocks of the host).

The command may be a write command to write the data associated with the command to the data storage or a read command to read the data associated with the command from the data storage. The storage controller 102 may obtain an age associated with the address. For example, the storage controller 102 may keep records of previous accesses for the address and save the records in a temporary storage (e.g., a register or memory in the storage controller 102, not shown). The storage controller 102 may obtain a most recent access for the address and compute the age between the command and the most recent access. In one embodiment, the age may be an index difference between the current command and the most recent access for the same address. For example, the current command may be the $20^{th}$ command from the host (e.g., index being 20) and the storage controller 102 may go through previous commands (e.g., commands with indices 19, 18, 17, . . . ) and find the $12^{th}$ command with same LBA address. Then the age may be eight (8) (e.g., 20 minus 12). In another embodiment, the age may be the timing difference between the current command and the most recent command that has the same address.

In one embodiment, the address of the current command may be sent to a clustering machine 202 as its input. In another embodiment, the address and length of current command may be sent to the clustering machine 202 as its input. In yet another embodiment, the address, length and age information may be sent to a clustering machine 202 as input. The clustering machine 202 may be configured to classify the command into one of a plurality of clusters 204.1 through 204.N, in which N may be a positive integer larger than one. In some embodiments, the number N may be selected to be a large number regardless of actual usage environment, for example, the number N may be selected as 50, or 100. A large number N may provide a good performance but it may need hardware and/or software resources to support such a configuration. In at least one embodiment, the number N may be selected based on a usage environment. For example, if the storage system 100 is to be used with a host that runs very few applications, the number N may be selected to be a low number close to the number of few applications. If the storage system 100 is to be used with a host that runs many applications, the number N may be selected to be a high number close to the number of many application. In an embodiment, for example, the storage system 100 may be configured for a benchmark performance test using a Storage Performance Council (SPC) On-line Transaction Processing (OLTP) Financial Dataset (e.g., "Financial1.spc" known in the industry). This test dataset provides collections for I/O commands of on-line transaction processing data. The test dataset may comprise 24 applications, referred to as Application Specific Units (ASUs). In this test dataset usage, the number N for the storage system 100 set to 25 may have a better performance than a number lower than 24, such as, 5 or 10.

In some embodiments, the clustering machine 202 may be implemented by a machine learning clustering model, such as but not limited to, a K-means clustering machine, in which K may be the positive number N and determined by conventional K-means clustering techniques. In an embodiment, the machine learning clustering model may be implemented by the MCU 114. For example, the machine learning clustering model may be programmed in software and the MCU 114 may execute software program instructions to classify a command from the host into one of a plurality of K clusters. In another embodiment, the machine learning clustering model may be implemented in hardware, for example, by ASIC, FPGA, GPU or a combination of them. For example, in some embodiments, the accelerator 116 may be configured to implement the machine learning clustering model. In yet another embodiment, the machine learning clustering model may be implemented by a combination of software and hardware.

Once the clustering machine 202 classifies the command into a cluster, the storage controller 102 may obtain historical information for the cluster. For example, the storage controller 102 may keep records of previous commands for all clusters (e.g., in a register or memory in the storage controller 102, not shown) and a pre-determined number of previous commands may be retrieved. In an embodiment, the retrieved information may include addresses, lengths, indices, timings (when the commands are sent) or ages of the pre-determined number of most recent commands. The hot/cold predictor 206 may take the address, length and age of the command (e.g., the current command), and addresses, lengths and ages of the historical commands as inputs to determine whether the data associated with the command is hot or cold.

In some embodiments, the hot/cold predictor 206 may be implemented by a machine learning model, for example, a neural network. In an embodiment, the machine learning model may be implemented by the MCU 114. For example, the machine learning model may be programmed in software and the MCU 114 may execute software program instructions to determine whether data associated with the current command is hot or cold. In another embodiment, the machine learning model may be implemented in hardware, for example, ASIC, FPGA, GPU, or a combination of ASIC, FPGA and GPU. For example, in some embodiments, the accelerator 116 may be configured to implement the hot/cold predictor 206. In yet another embodiment, the machine learning model may be implemented by a combination of software and hardware.

In some embodiments, the address, length and age of the command and addresses, lengths and ages of the historical commands may be used as inputs to the machine learning model for the hot/cold predictor 206. The number of most recent commands to be used as historical commands for the hot/cold predictor 206 may be a hyperparameter for the machine learning model. In an embodiment, the number of most recent commands may be selected based on resources available in the storage controller, e.g., storage capacity for keeping records of previous commands, power consumption, computation resource for the hot/cold predictor 206.

It should be noted that the storage controller 102 may map the logical address in the command to a physical address in a storage device when accessing the storage device (e.g., one of the NAND 104.1 through 104.M). However, the hot/cold determination does not interfere with this mapping and may be used for efficiently managing the storage device (e.g., for garbage collection, overprovisioning, or wear leveling).

Figure 3:
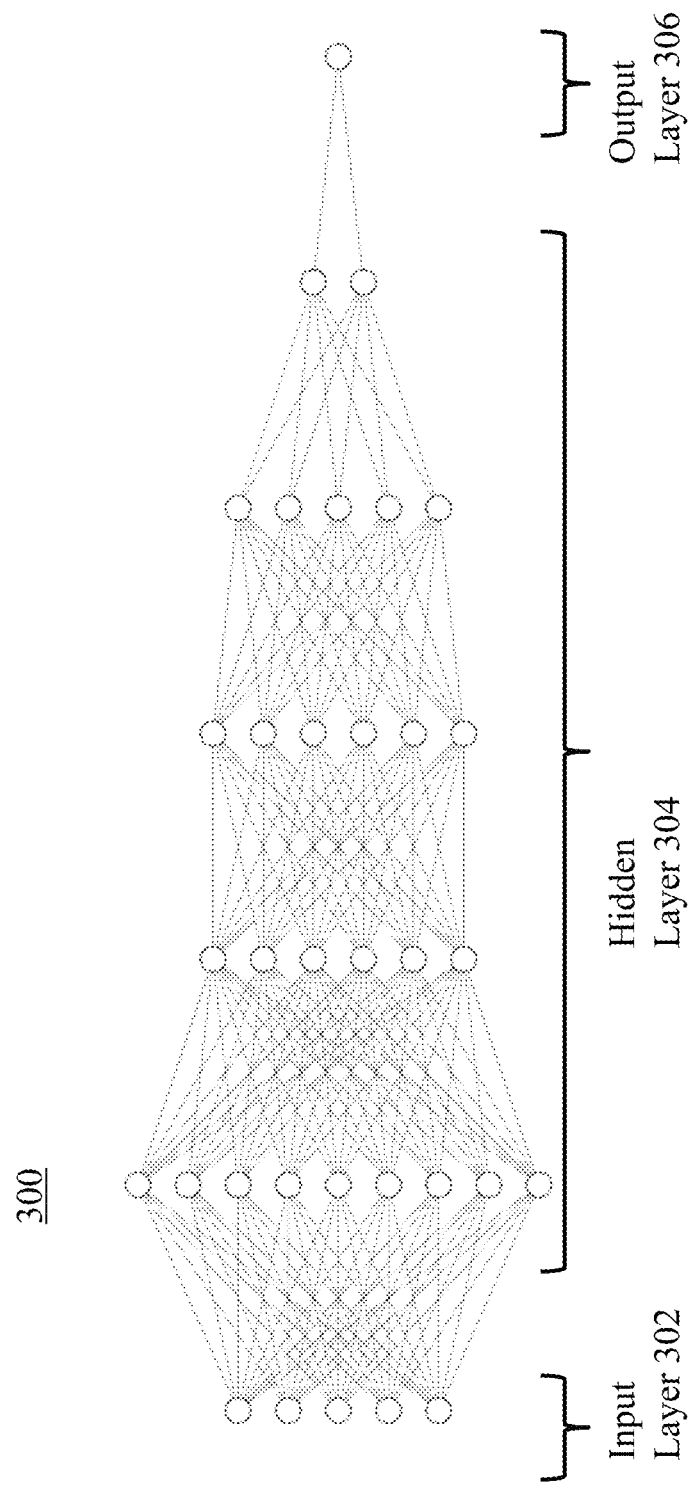
FIG. 3 schematically shows another neural network in accordance with an embodiment of the present disclosure.

FIG. 3 schematically shows a neural network 300 in accordance with an embodiment of the present disclosure. The neural network 300 may comprise a collection of connected units or nodes called artificial neurons, which loosely model neurons in a biological brain. The neurons of the neural network 300 may be grouped into three layers: an input layer 302, a hidden layer 304 and an output layer 306. The input layer 302 may comprise neurons configured to receive input signals, which may be referred to as input features. The hidden layer 304 may comprise one or more layers of neurons between the input layer 302 and output layer 306. The output layer 306 may comprise one or more neurons to output a signal based on input conditions. In some embodiments, signal at a connection between two neurons may be a real number. Output of each neuron may be computed by an activation function, which may be a non-linear function of the sum of its inputs. Non-limiting examples of the activation functions may include, Sigmoid, Tanh, Rectified Linear Unit (ReLU), and Leaky-ReLU. In one embodiment, the output layer 306 may comprise one neuron to output a label that indicates whether data associated with a command is hot or cold.

The machine learning model of the hot/cold predictor 206 may have a loss function. In one embodiment, the loss function may be a mean squared error (MSE):

$$MSE = \frac{1}{n}\sum_{i=1}^{n}(Y_i - \hat{Y}_i)^2,$$

in which "n" may be the number of dimensions of a data point or the number of output nodes in the output layer (e.g., 1 in the hot/cold prediction), $Y_i$ may be a labeled value of hot or cold for the data associated with a command being predicted (e.g., the current command) and $\hat{Y}_L$ may be a predicted value (by the neural network) of hot or cold. In an embodiment, the labeled values of hot or cold for data associated with commands in a dataset may be obtained using a known algorithm, for example, Window-Based Direct Access Counting (WDAC). The machine learning model of the hot/cold predictor 206 may be trained and optimized using a conventional or any suitable training and optimization process for a neural network. In an embodiment, the training and optimization process may comprise applying input data and propagating computed data to output, computing the loss between a labeled value and a predicted value using the loss function, performing a back-propagation of error and optimizing parameters of the neural network with a gradient algorithm. This process may be iterated until the loss is smaller than a pre-defined loss threshold or the training epoch exceeds a pre-defined epoch threshold. In some embodiments, there may be a validation dataset for profiling the training results in a validation process, a test dataset for testing the neural network in a testing process, or both.

In some embodiments, after an initial training process, the neural network may be further trained with an online learning process to adjust its parameters. For example, after the storage system 100 has been put into use, the storage controller 102 may be configured to continuously or intermittently to adjust the parameters of the neural network with work data.

In an embodiment, the input layer 302 may comprise a plurality of neurons to receive input features that include the address, length, age of a command (e.g., the current command), and addresses, lengths, ages of a plurality of historical commands. In an embodiment, in addition to the addresses, lengths, ages of the command and historical commands, the inputs to the hot/cold predictor 206 may also comprise an inter-reference recency (IRR), which may be the age for a most recent command that has the same address as a command being considered. For example, one address (e.g., LBA 001) may appear in commands with indices i0, i1, i2 and i3 at times t0, t1, t2, t3, then for the command at time t2, its age may be i2-i1 (or t2-t1 for timing based) and its IRR may be i1-i0 (or t1-t0 for timing based), and for the command at time t3, its age may be i3-i2 (or t3-t2 for timing based) and its IRR may be i2-i1 (or t2-t1 for timing based). In this embodiment, the inputs to the hot/cold predictor 206 may comprise addresses, lengths, ages and IRRs of the command and historical commands.

It should be noted that in some embodiments, the IRR may be referred to as a first order recency and the input features to the machine learning model may further comprise one or more higher order recencies. For example, a second order recency may be the age of the second-last command, and a third order recency may be the age of the third-last command. Using the example in which the same address is in the commands with indices i0, i1, i2 and i3 at times t0, t1, t2, t3, for the command at time t3, its age may be i3-i2 (or t3-t2 for timing based), its IRR (or first order recency) may be i2-i1 (or t2-t1 for timing based), and its second order recency may be i1-i0 (or t1-t0 for timing based). In this embodiment, the inputs to the hot/cold predictor 206 may comprise addresses, lengths, ages, the first order recencies, and one or more higher order recencies of the command and historical commands.

In some embodiments, the inputs to the hot/cold predictor 206 may further include op codes for the current and historical commands that indicate whether a respective command is write or read.

In one embodiment, the neural network implementing the hot/cold predictor 206 may have 100 neurons at an input layer. The 100 neurons may take five input features from a current command and 19 previous command of the same cluster. The five input features may be address, length, age, IRR, and op code (e.g., write or read). The hidden layer may comprise 5 different layers each with a plurality of nodes. The output layer may comprise one output neuron. For the training process, the loss function may be mean squared error, the batch size may be 128, epoch may be one (e.g., go through the whole dataset once), the learning rate for the gradient algorithm may be 0.001, the activation function may be Leaky-ReLU. In a benchmark test using the SPC OLTP dataset (e.g., the "Financial1.spc" dataset) and WDAC, for a total of 350508 test commands, the overall accuracy may reach 99.86%, in which 147925 commands with hot data may have an accuracy of 99%, and 202583 commands with cold data may also have an accuracy of 99%.

Figure 4:
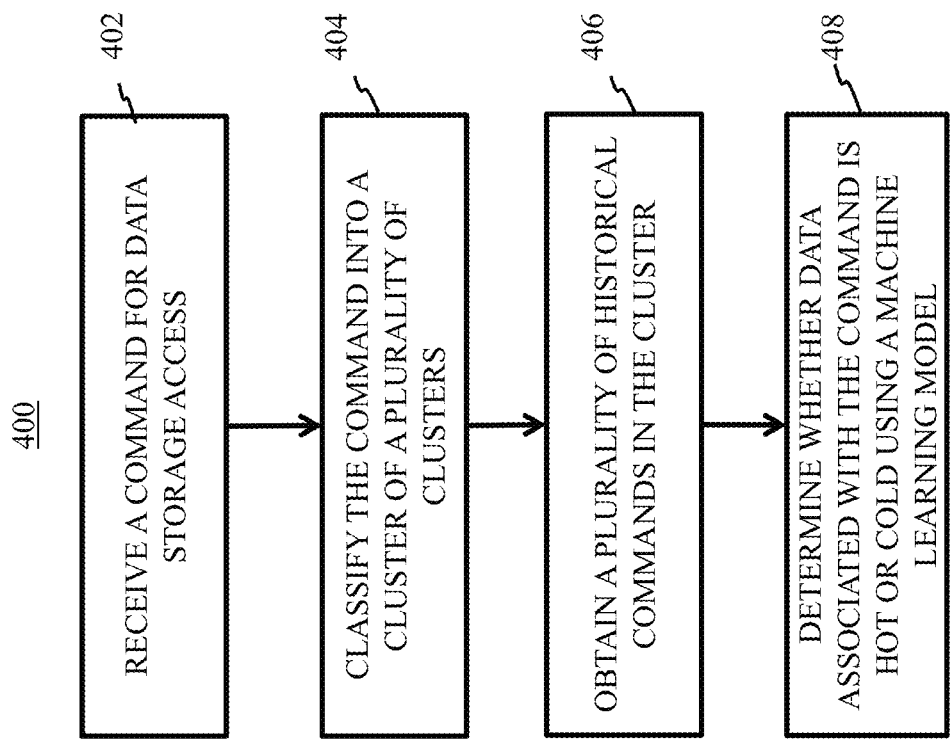
FIG. 4 is a flowchart of a process for determining hot/cold data in accordance with an embodiment of the present disclosure.

FIG. 4 is a flowchart of a process 400 for determining hot/cold data in accordance with an embodiment of the present disclosure. At block 402, a command may be received in a data storage system. For example, a memory access command for reading or writing (e.g., a read or write command) may be received by the storage controller 102 from a host via the first interface 110. The command may contain an address (e.g., LBA) for data storage in the data storage system and a length for a size of data associated with the command. At block 404, the command may be classified into one of a plurality of clusters. For example, a host computing system may have many applications running and each application may have different memory access patterns. The storage controller 102 may generate a plurality of clusters using a clustering machine, for example, a machine learning clustering model such as a K-means clustering machine, and classify the command into one of the plurality of clusters using the clustering machine. In an embodiment, the classification may be based on the command's address (e.g., LBA), length, and age.

At block 406, a plurality of historical commands of the cluster may be obtained. For example, the storage controller 102 may be configured to keep records of previous commands. Once the command is classified into a cluster, a plurality of previous commands classified into the same cluster may be obtained from a storage (e.g., memory or register). As described herein, the plurality of historical commands may include a pre-determined number of most recent commands that had been classified into this cluster. At block 408, whether the data associated with the command is hot or cold may be determined using a machine learning model. The address and the length of the command and addresses and lengths of the plurality of historical commands may be used as input features to the machine learning model.

It should be appreciated that in some embodiments, the storage controller 102 may include fewer or more modules apart from those shown in FIG. 1. Moreover, the techniques described herein may be implemented in hardware, in software, or a combination of hardware and software. The choice of implementing any portion of the above techniques in hardware or software may depend on the requirements of an implementation. For example, the process 400 may be in the form of firmware that is processed by Application Specific Integrated Circuits (ASICs), which may be integrated into a circuit board. Alternatively, the process 400 may be in the form of one or more logic blocks included in a programmable logic device (e.g., a field-programmable gate array). Moreover, the process 400 or at least portion of the process 400 may be implemented by computer software instructions and encoded in volatile memory, non-volatile memory, RAM, flash memory, ROM, EPROM, or any other form of a non-transitory computer-readable storage medium.

In an exemplary embodiment, there is provided an apparatus that may comprise a first interface to be coupled to a host and circuitry configured to: receive a command via the first interface from the host, the command containing an address for data storage in a data storage system and a length for a size of data associated with the command; classify the command into a cluster of a plurality of clusters; obtain a plurality of historical commands in the cluster; and determine whether the data associated with the command is hot or cold data using a machine learning model with the address and the length of the command and addresses and lengths of the plurality of historical commands as input features to the machine learning model.

In an embodiment, the command may be classified at least in part based on the address.

In an embodiment, the apparatus may further comprise a second interface to be coupled to one or more storage devices of the data storage system. The circuitry may be further configured to map the address into a physical address in the data storage system and access the physical address via the second interface.

In an embodiment, the circuitry may comprise an accelerator for the machine learning model.

In an embodiment, the input features may further include ages and inter-reference recencies (IRRs) for the command and historical commands.

In an embodiment, the input features may further include op codes of the command and historical commands indicating whether a respective command is write or read.

In an embodiment the input features may further include one or more higher order recencies for the command and historical commands.

In an embodiment, the circuitry may be configured to implement a machine learning clustering model for classifying the command.

In another exemplary embodiment, there is provided a method comprising: receiving a command in a data storage system, the command containing an address for data storage in the data storage system and a length for a size of data associated with the command; classifying the command into a cluster of a plurality of clusters; obtaining a plurality of historical commands in the cluster; and determining whether the data associated with the command is hot or cold data using a machine learning model with the address and the length of the command and addresses and lengths of the plurality of historical commands as input features to the machine learning model.

In an embodiment, the command may be classified at least in part based on the address.

In an embodiment, the method may further comprise mapping the address into a physical address in the data storage system and accessing the physical address.

In an embodiment, the input features may further include ages and inter-reference recencies (IRRs) for the command and historical commands.

In an embodiment, the input features may further include op codes of the command and historical commands indicating whether a respective command is write or read.

In an embodiment, the input features may further include one or more higher order recencies for the command and historical commands.

In an embodiment, classifying the command into a cluster of a plurality of clusters is performed using a machine learning clustering model.

In an embodiment, the method may further comprise adjusting parameters of the machine learning model by performing an online learning.

In an embodiment, the plurality of historical commands may include a pre-determined number of most recent commands, and the pre-determined number may be a hyperparameter of the machine learning model.

In yet another embodiment, there may be provided one or more non-transitory computer-readable media encoded with computer executable instructions that, when executed, cause at least one processor to perform actions comprising: receiving a command in a data storage system, the command containing an address for data storage in the data storage system and a length for a size of data associated with the command; classifying the command into a cluster of a plurality of clusters; obtaining a plurality of historical commands in the cluster; and determining whether the data associated with the command is hot or cold data using a machine learning model with the address and the length of the command and addresses and lengths of the plurality of historical commands as input features to the machine learning model.

In an embodiment, the command may be classified at least in part based on the address.

In an embodiment, the input features may further include ages and inter-reference recencies (IRRs) for the command and historical commands.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
a first interface to be coupled to a host; and
a storage controller configured to:
receive a command via the first interface from the host, the command containing an address for data storage in a data storage system and a length for a size of data associated with the command;
classify the command into a cluster of a plurality of clusters;
obtain a plurality of historical commands in the cluster; and
determine whether the data associated with the command is hot or cold data using a machine learning model with the address and the length of the command and addresses and lengths of the plurality of historical commands as input features to the machine learning model, wherein the input features further include ages and inter-reference recencies (IRRs) for the command and historical commands.

2. The apparatus of claim 1, wherein the command is classified at least in part based on the address.

3. The apparatus of claim 1, further comprising a second interface to be coupled to one or more storage devices of the data storage system, wherein the storage controller is further configured to map the address into a physical address in the data storage system and access the physical address via the second interface.

4. The apparatus of claim 1, wherein the storage controller comprises an accelerator for the machine learning model.

5. The apparatus of claim 1, wherein the input features further include op codes of the command and historical commands indicating whether a respective command is write or read.

6. The apparatus of claim 1, wherein the input features further include one or more higher order recencies for the command and historical commands.

7. The apparatus of claim 1, wherein the storage controller is configured to implement a machine learning clustering model for classifying the command.

8. A method, comprising:
receiving a command in a data storage system, the command containing an address for data storage in the data storage system and a length for a size of data associated with the command;
classifying the command into a cluster of a plurality of clusters;
obtaining a plurality of historical commands in the cluster; and
determining whether the data associated with the command is hot or cold data using a machine learning model with the address and the length of the command and addresses and lengths of the plurality of historical commands as input features to the machine learning model, wherein the input features further include ages and inter-reference recencies (IRRs) for the command and historical commands.

9. The method of claim 8, wherein the command is classified at least in part based on the address.

10. The method of claim 8, further comprising mapping the address into a physical address in the data storage system and accessing the physical address.

11. The method of claim 8, wherein the input features further include op codes of the command and historical commands indicating whether a respective command is write or read.

12. The method of claim 8, wherein the input features further include one or more higher order recencies for the command and historical commands.

13. The method of claim 8, wherein classifying the command into a cluster of a plurality of clusters is performed using a machine learning clustering model.

14. The method of claim 8, further comprising adjusting parameters of the machine learning model by performing an online learning.

15. The method of claim 8, wherein the plurality of historical commands include a pre-determined number of most recent commands, and the pre-determined number is a hyperparameter of the machine learning model.

16. One or more non-transitory computer readable storage media encoded with computer executable instructions that, when executed, cause at least one processor to perform actions comprising:
receiving a command in a data storage system, the command containing an address for data storage in the data storage system and a length for a size of data associated with the command;
classifying the command into a cluster of a plurality of clusters;
obtaining a plurality of historical commands in the cluster; and
determining whether the data associated with the command is hot or cold data using a machine learning model with the address and the length of the command and addresses and lengths of the plurality of historical commands as input features to the machine learning model, wherein the input features further include ages and inter-reference recencies (IRRs) for the command and historical commands.

17. The non-transitory computer readable storage media of claim 16, wherein the command is classified at least in part based on the address.

18. An apparatus, comprising:
a first interface to be coupled to a host; and
a storage controller configured to:
receive a command via the first interface from the host, the command containing an address for data storage in a data storage system and a length for a size of data associated with the command;
classify the command into a cluster of a plurality of clusters;
obtain a plurality of historical commands in the cluster; and
determine whether the data associated with the command is hot or cold data using a machine learning model with the address and the length of the command and addresses and lengths of the plurality of historical commands as input features to the machine learning model, wherein the plurality of historical commands include a pre-determined number of most recent commands, and the pre-determined number is a hyperparameter of the machine learning model.

19. A method, comprising:

receiving a command in a data storage system, the command containing an address for data storage in the data storage system and a length for a size of data associated with the command;

classifying the command into a cluster of a plurality of clusters;

obtaining a plurality of historical commands in the cluster; and determining whether the data associated with the command is hot or cold data using a machine learning model with the address and the length of the command and addresses and lengths of the plurality of historical commands as input features to the machine learning model, wherein the plurality of historical commands include a pre-determined number of most recent commands, and the pre-determined number is a hyperparameter of the machine learning model.

20. One or more non-transitory computer readable storage media encoded with computer executable instructions that, when executed, cause at least one processor to perform actions comprising:

receiving a command in a data storage system, the command containing an address for data storage in the data storage system and a length for a size of data associated with the command;

classifying the command into a cluster of a plurality of clusters;

obtaining a plurality of historical commands in the cluster; and determining whether the data associated with the command is hot or cold data using a machine learning model with the address and the length of the command and addresses and lengths of the plurality of historical commands as input features to the machine learning model, wherein the plurality of historical commands include a pre-determined number of most recent commands, and the pre-determined number is a hyperparameter of the machine learning model.

* * * * *